(12) United States Patent
Yamakawa et al.

(10) Patent No.: US 7,991,700 B2
(45) Date of Patent: Aug. 2, 2011

(54) ENTRUSTEE INFORMATION TRANSMITTING APPARATUS, ENTRUSTEE INFORMATION TRANSMITTING METHOD AND COMPUTER READABLE MEDIUM HAVING A PROGRAM IMPLEMENTING SAME

(75) Inventors: Hiroshi Yamakawa, Kawasaki (JP); Koji Maruhashi, Kawasaki (JP); Yoshio Nakao, Kawasaki (JP); Nobuo Watanabe, Kawasaki (JP); Masahiro Asaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 12/216,906

(22) Filed: Jul. 11, 2008

(65) Prior Publication Data

US 2009/0026264 A1 Jan. 29, 2009

(30) Foreign Application Priority Data

Jul. 25, 2007 (JP) ................................ 2007-193728

(51) Int. Cl.
*G06Q 20/00* (2006.01)
(52) U.S. Cl. .......................................... 705/76; 705/12
(58) Field of Classification Search .................. 705/12
See application file for complete search history.

(56) References Cited

U.S. PATENT DOCUMENTS

| | | | | |
|---|---|---|---|---|
| 5,758,097 A * | 5/1998 | Debe et al. | ....................... | 705/35 |
| 6,112,188 A * | 8/2000 | Hartnett | ....................... | 705/36 R |
| 6,952,678 B2 * | 10/2005 | Williams et al. | ............... | 705/320 |
| 7,207,487 B2 * | 4/2007 | Faulk | ............................. | 235/386 |
| 7,386,518 B2 * | 6/2008 | Cordery et al. | .................. | 705/78 |
| 7,475,817 B2 * | 1/2009 | Faulk | ............................. | 235/386 |
| 7,640,182 B2 * | 12/2009 | Wallman | .......................... | 705/12 |
| 7,665,662 B2 * | 2/2010 | Faulk | ............................. | 235/386 |
| 7,729,972 B2 * | 6/2010 | Murphy et al. | ............... | 705/36 T |
| 2001/0034680 A1 * | 10/2001 | Purcell | ............................. | 705/35 |
| 2001/0037234 A1 * | 11/2001 | Parmasad et al. | ................ | 705/12 |
| 2002/0029183 A1 * | 3/2002 | Vlahoplus et al. | ............... | 705/37 |
| 2002/0082907 A1 * | 6/2002 | Inomata et al. | .................. | 705/12 |
| 2003/0046207 A1 * | 3/2003 | Torre et al. | ....................... | 705/36 |

(Continued)

FOREIGN PATENT DOCUMENTS

JP  8-329154  12/1996

OTHER PUBLICATIONS

"Proxy voting", WorldLingo, Oct. 30, 2010, all pages. <http://www.worldlingo.com/ma/enwiki/en/Proxy_voting>.*

(Continued)

*Primary Examiner* — Andrew J. Fischer
*Assistant Examiner* — Calvin K Cheung
(74) *Attorney, Agent, or Firm* — Staas & Halsey LLP

(57) ABSTRACT

An entrustee information transmitting method includes an entrustment managing storage storing entrustment relationship information indicating correspondence between entrusters who are voters performing entrustment and entrustees who are voters entrusted by the entrusters in an entrustment managing storage unit; an attendance managing storage storing attendance information of respective voters in an attendance managing storage unit in units of bills; an indirect-entrustment voter extracting operation of extracting one or more indirect-entrustment voter who indirectly entrust an attendee by using the entrustment relationship information and the attendance information; an entrustee determining operation of determining attendees who are indirectly entrusted by the indirect-entrustment voters to be recommended entrustees; and an entrustee information transmitting operation of transmitting information of the recommended entrustees.

13 Claims, 17 Drawing Sheets

U.S. PATENT DOCUMENTS

| | | | |
|---|---|---|---|
| 2003/0055719 A1* | 3/2003 | Faigle | 705/12 |
| 2003/0105697 A1* | 6/2003 | Griffin et al. | 705/36 |
| 2003/0182177 A1* | 9/2003 | Gallagher et al. | 705/10 |
| 2003/0189592 A1* | 10/2003 | Boresjo | 345/751 |
| 2004/0167849 A1* | 8/2004 | Yass et al. | 705/37 |
| 2005/0288996 A1* | 12/2005 | Wallman | 705/12 |
| 2007/0106552 A1* | 5/2007 | Matos | 705/12 |
| 2007/0118486 A1* | 5/2007 | Burchetta et al. | 705/80 |
| 2008/0195437 A1* | 8/2008 | Koenig et al. | 705/7 |
| 2008/0222041 A1* | 9/2008 | Mani | 705/51 |
| 2009/0112705 A1* | 4/2009 | Eiben et al. | 705/12 |
| 2009/0138343 A1* | 5/2009 | Knowles et al. | 705/12 |
| 2010/0049647 A1* | 2/2010 | De Chabris | 705/37 |

OTHER PUBLICATIONS

"Proxy Vote", Wikipedia, Oct. 30, 2010. <http://en.wikipedia.org/wiki/Proxy_voting>.*

Bergen, Jason V, "Proxy Voting Gives Fund Shareholders A Say", Investopedia, all pages. <http://www.investopedia.com/>.*

* cited by examiner

FIG. 4

| VOTER ID | NAME | AUTHENTICATION INFORMATION | E-MAIL ADDRESS |
|---|---|---|---|
| SK00001 | ISHIKAWA○○ | 9p9o5i;gopdw;lk:r;lkfkdl | xxxx@xxx.com |
| SK00002 | SUZUKI ○○ | ja;ajealjfaeiojfj;oifja | xxxx@xxx.com |
| SK00003 | TAKAHASHI ○○ | afaeafaekapfkeakfeakfaek | xxxx@xxx.com |
| ... | ... | ... | ... |
| SK55005 | TANAKA ○○ | 9q93kfwi5ghw908jg9w@ | xxxx@xxx.com |
| ... | ... | ... | ... |
| SK61001 | KATO ○○ | 39q4@0m:jg5th5mga:::ee | xxxx@xxx.com |
| ... | ... | ... | ... |

| BILL ID | BILL TITLE | DATE AND TIME OF MEETING | PLACE OF MEETING | ORGANIZER | CONTENT OF BILL |
|---|---|---|---|---|---|
| KK00001 | ABC COMMITTEE | XXXX/XX/XX XX:XX-XX:XX | CONFERENCE ROOM 21 | SK100001 | ○○○○○ |
| KK00002 | PEER REVIEW | XXXX/XX/XX XX:XX-XX:XX | CONFERENCE ROOM 22 | SK610001 | ××××× |
| KK00003 | TOOL INTRODUCING DEMONSTRATION | XXXX/XX/XX XX:XX-XX:XX | CONFERENCE ROOM 21 | SK620001 | □□□□ |
| KK00004 | EVALUATION MEETING | XXXX/XX/XX XX:XX-XX:XX | CONFERENCE ROOM 10 | SK610001 | △△△△△ |
| ... | ... | ... | ... | ... | ... |

BILL ID: KK0001

| ENTRUSTER | ATTENDANCE | CLASSIFICATION |
|---|---|---|
| VOTER 1 | ATTENDEE | DIRECT ENTRUSTMENT |
| VOTER 2 | ABSENTEE | ATTENDEE |
| VOTER 3 | ABSENTEE | INDIRECT ENTRUSTMENT |
| VOTER 4 | ABSENTEE | DIRECT ENTRUSTMENT |
| VOTER 5 | ABSENTEE | INEFFECTIVE |
| VOTER 6 | ATTENDEE | ATTENDEE |
| VOTER 7 | ATTENDEE | ATTENDEE |
| VOTER 8 | ABSENTEE | INEFFECTIVE |

FIG. 7

BILL ID: KK0001

| ENTRUSTER | ENTRUSTEE | DISTRIBUTION |
|---|---|---|
| VOTER 1 | VOTER 6 | 0.5 |
| VOTER 1 | VOTER 2 | 0.5 |
| VOTER 2 | VOTER 7 | 1 |
| VOTER 3 | VOTER 1 | 0.4 |
| VOTER 3 | VOTER 4 | 0.6 |
| VOTER 4 | VOTER 3 | 0.3 |
| VOTER 4 | VOTER 7 | 0.7 |
| VOTER 5 | VOTER 8 | 1 |

| BILL ID: KK0001 | | | |
|---|---|---|---|
| ENTRUSTER | ENTRUSTEE | ATTENDANCE | CLASSIFICATION |
| VOTER 1 | VOTER 2 | ABSENTEE | DIRECT ENTRUSTMENT |
| VOTER 2 | VOTER 6 | ATTENDEE | ATTENDEE |
| VOTER 3 | VOTER 1 | ABSENTEE | INDIRECT ENTRUSTMENT |
| VOTER 4 | VOTER 7 | ABSENTEE | DIRECT ENTRUSTMENT |
| VOTER 5 | VOTER 8 | ABSENTEE | INEFFECTIVE |
| VOTER 6 | VOTER 1 | ATTENDEE | ATTENDEE |
| VOTER 7 | VOTER 4 | ATTENDEE | ATTENDEE |
| VOTER 8 | VOTER 5 | ABSENTEE | INEFFECTIVE |

ENTRUSTEE INFORMATION TRANSMITTING APPARATUS, ENTRUSTEE INFORMATION TRANSMITTING METHOD AND COMPUTER READABLE MEDIUM HAVING A PROGRAM IMPLEMENTING SAME

CROSS-REFERENCE TO RELATED APPLICATIONS

This application claims the benefit of the prior Japanese Patent Application No. 2007-193728, filed Jul. 25, 2007, in the Japanese Intellectual Property Office, the disclosure of which is incorporated herein by reference.

BACKGROUND

1. Field

The embodiments discussed herein are directed to providing information to voters.

2. Description of the Related Art

Conventionally, a decision can be made through voting for a candidate by voters, for example, in an election of a labor union; a shareholders' meeting; an election to elect a director or a general meeting of a management association or a residents' association of complex housing; collection of opinions about a social problem of environment, city planning, and so on; a decision of a person to be given with an award; and a decision of an off meeting of a community.

In such a decision, a voter who will be absent can entrust another voter. That is, when a voter who will be absent entrusts another voter and when the voter as an entrustee votes, the vote of the absent voter can also be cast.

In such a decision, conventionally a rule in making a decision in an actual general meeting permitted only direct entrustment to a voter who attends the general meeting in many cases, and typically a vote of a voter who performs indirect entrustment is invalid. For example, in a case where an absent voter A entrusts another voter B, where the voter B entrusts a voter C, and where the voter B is absent, the entrustment of the voter A is indirect entrustment and thus the vote of the voter A is invalid.

Therefore, when a voter who will be absent wants to perform entrustment and when there is no acquaintance as an entrustee among attendees of the general meeting, meaningful entrustment may not be performed, and thus the voter abstains from voting or leaves a decision to the discretion of a chairman.

As an example, a conventional technique to prevent indirect entrustment determined whether a voter has been entrusted by someone and maintaining an input standby state to refuse entrustment if the voter has been entrusted by someone.

In this technique, however, if entrustment is refused and if there is no acquaintance as an entrustee among the other voters, meaningful entrustment may not be performed and thus an opportunity to obtain a will of the voter is wasted.

SUMMARY

It is an aspect of an embodiment discussed herein to provide an entrustee information transmitting method for transmitting information of entrustees to one or more indirect-entrustment voters who indirectly entrust an attendee of a decision that is made through voting by a plurality of voters. The method includes an entrustment managing storage operation of storing entrustment relationship information indicating correspondence between entrusters who are voters performing entrustment and entrustees who are voters entrusted by the entrusters in an entrustment managing storage unit; an attendance managing storage operation of storing attendance information of respective voters in an attendance managing storage unit in units of bills; an indirect-entrustment voter extracting operation of extracting one or more indirect-entrustment voter who indirectly entrust an attendee by using the entrustment relationship information stored in the entrustment managing storage unit and the attendance information stored in the attendance managing storage unit; an entrustee determining operation of determining attendees who are indirectly entrusted by the indirect-entrustment voters extracted in the indirect-entrustment voter extracting operation to be recommended entrustees; and an entrustee information transmitting operation of transmitting information of the recommended entrustees determined in the entrustee determining operation to the indirect-entrustment voters.

The above aspects can be attained by a system that

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 illustrates an example of a voter managing database;

FIG. 5 illustrates an example of a bill managing database;

FIG. 6 illustrates an example of an attendance managing database;

FIG. 7 illustrates an example of an entrustment managing database;

FIG. 15 illustrates an example of an attendance/entrustment managing database;

DETAILED DESCRIPTION OF THE EMBODIMENTS

Hereinafter, Reference will now be made in detail to the embodiments examples of which are illustrated in the accompanying drawings.

In the following description, an outline, a feature, a configuration, and a process of a general-meeting holding assistance apparatus according to an example embodiment are described, and advantages of an example embodiment are described.

Figure 1:
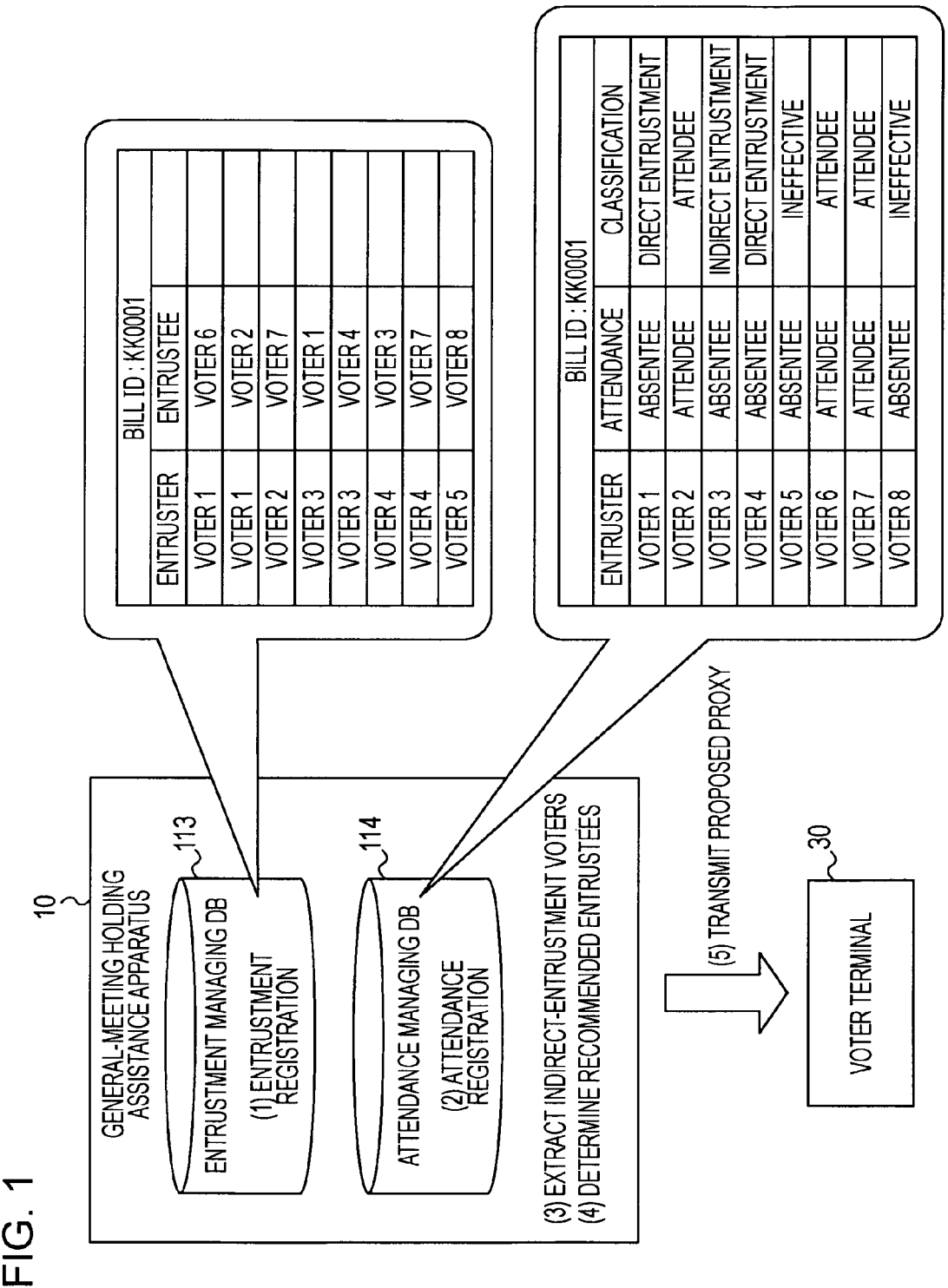
FIG. 1 illustrates a general-meeting holding assistance apparatus according to an example embodiment.

FIG. 1 illustrates an outline and a feature of the general-meeting holding assistance apparatus according to an example embodiment.

The general-meeting holding assistance apparatus 10 according to an example embodiment transmits information of entrustees to one or more indirect-entrustment voters who indirectly entrust an attendee in a decision that is made through voting by a plurality of voters. The general-meeting holding assistance apparatus 10 has a feature in realizing voting that reflects meaningful intentions of many voters.

This feature is further described. The general-meeting holding assistance apparatus 10 can include an entrustment managing database (DB) 113 to store entrustment relationship information about correspondence between entrusters who are voters performing entrustment and entrustees who are voters entrusted by the entrusters; and an attendance managing database (DB) 114 to store attendance information of respective voters in units of bills.

With this configuration, the general-meeting holding assistance apparatus 10 may accept entrustment registration from voters and stores entrustment relationship information in the entrustment managing DB 113 (see, for example, (1) in FIG. 1). Then, the general-meeting holding assistance apparatus 10 may accept attendance registration from the voters and store attendance information of the respective voters in the attendance managing DB 114 (see, for example, (2) in FIG. 1).

The general-meeting holding assistance apparatus 10 extracts one or more indirect-entrustment voters who indirectly entrust an attendee by using the entrustment relationship information stored in the entrustment managing DB 113 and the attendance information stored in the attendance managing DB 114 (see, for example, (3) in FIG. 1). The general-meeting holding assistance apparatus 10 may classify the respective voters into "attendee", "direct-entrustment voter", "indirect-entrustment voter", or "ineffective voter" by using the entrustment relationship information stored in the entrustment managing DB 113 and the attendance information stored in the attendance managing DB 114, and store the classification of the respective voters: any of "attendee", "direct entrustment", "indirect entrustment", and "ineffective", in the attendance managing DB 114. Then, the general-meeting holding assistance apparatus 10 extracts one or more voters classified into "indirect entrustment".

The general-meeting holding assistance apparatus 10 determines attendees who are indirectly entrusted by the extracted indirect-entrustment voter(s) to be recommended entrustees (see, for example, (4) in FIG. 1). The general-meeting holding assistance apparatus 10 determines all attendees who are indirectly entrusted to be recommended entrustees.

The general-meeting holding assistance apparatus 10 transmits information of the recommended entrustees determined in this way to each indirect-entrustment voter (see (5), for example, in FIG. 1). The general-meeting holding assistance apparatus 10 transmits a proposed proxy generated based on the entrustee information to a voter terminal 30 of the indirect-entrustment voter. In the proposed proxy, change to an entrustee for direct entrustment is recommended.

In this way, the general-meeting holding assistance apparatus 10 increases voters' opportunities to execute a proxy based on information of recommended entrustees. Accordingly, wasted votes caused by indirect entrustment decrease and a turnout increases. As a result, a meaningful voting that reflects intentions of many voters can be realized according to the above-described main feature.

Figure 2:
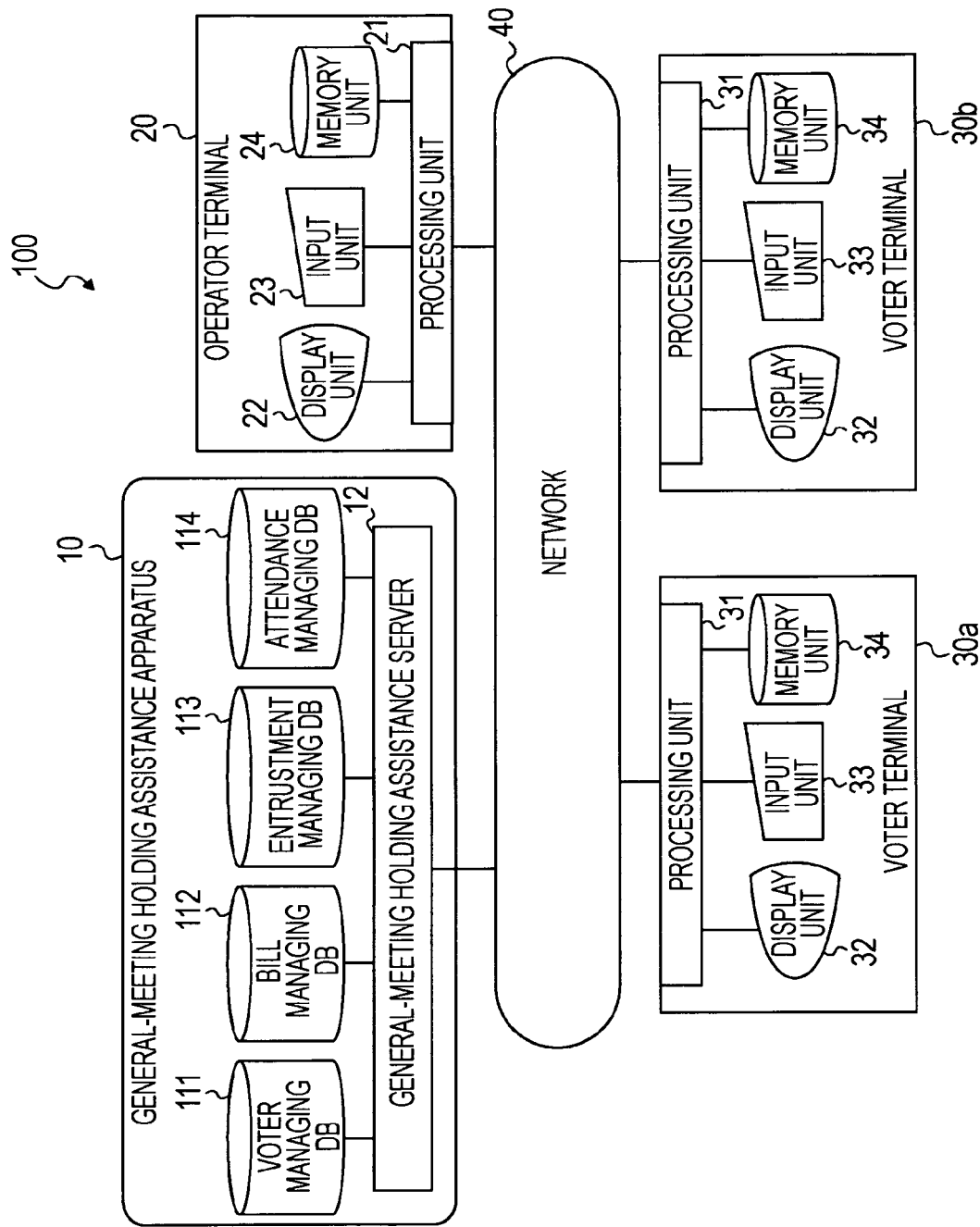
FIG. 2 illustrates a configuration of a general-meeting holding assistance system according to an example embodiment.

FIG. 2 illustrates a configuration of a general-meeting holding assistance system 100 according to an example embodiment. As illustrated in FIG. 2, the general-meeting holding assistance system 100 includes the general-meeting holding assistance apparatus 10, an operator terminal 20, and a plurality of voter terminals 30, which are mutually connected via a network 40.

As illustrated in FIG. 2, the general-meeting holding assistance apparatus 10 includes a voter managing DB 111 to store information about voters, a bill managing DB 112 to store information about bills, the entrustment managing DB 113 to store information about entrustment, the attendance managing DB 114 to store information about attendance, and a general-meeting holding assistance server 12 to execute various processes.

The general-meeting holding assistance apparatus 10 receives bills and holding information from the operator terminal 20, receives entrustment registration and attendance registration from the voter terminals 30, and transmits a proposed proxy or an attitude change request to the voter terminals 30.

The operator terminal 20 includes a processing unit 21, a display unit 22, and a memory unit 23 and performs a process about operation of a general meeting. The operator terminal 20 registers a bill of a general meeting in the general-meeting holding assistance apparatus 10 and also registers holding information (date and time, place, and so on) of the general meeting in the general-meeting holding assistance apparatus 10.

Each of the voter terminals 30 can include a processing unit 31, a display unit 32, an input unit 33, and a memory unit 34 and performs a process about a general meeting. The voter terminal 30 can login in the general-meeting holding assistance apparatus 10 before the date of a meeting and then performs entrustment registration to entrust a reliable voter in units of bills. Also, the voter terminal 30 transmits attendance information (present or absent) to the general-meeting holding assistance apparatus 10 in the system before the date of the meeting.

If the voter terminal 30 receives a proposed proxy before the date of the meeting, the voter changes an entrustee or performs attendance registration to the general-meeting holding assistance apparatus 10 with reference to the proposed proxy. Also, if the voter terminal 30 receives an attitude change request before the date of the meeting, the voter changes an entrustee or performs attendance registration to the general-meeting holding assistance apparatus 10.

Figure 3:
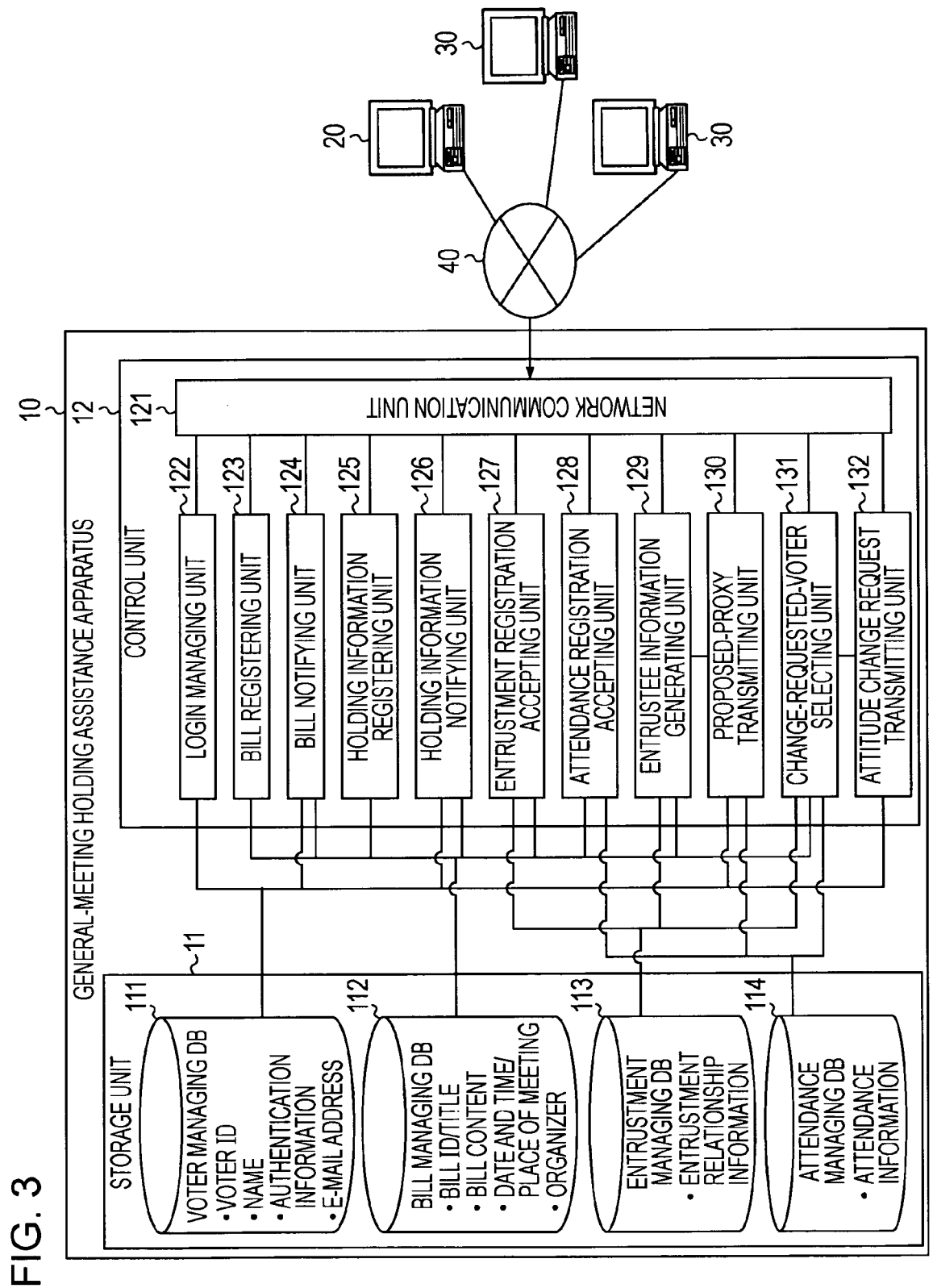
FIG. 3 illustrates a configuration of the general-meeting holding assistance apparatus according to an example embodiment.
Figure 8:
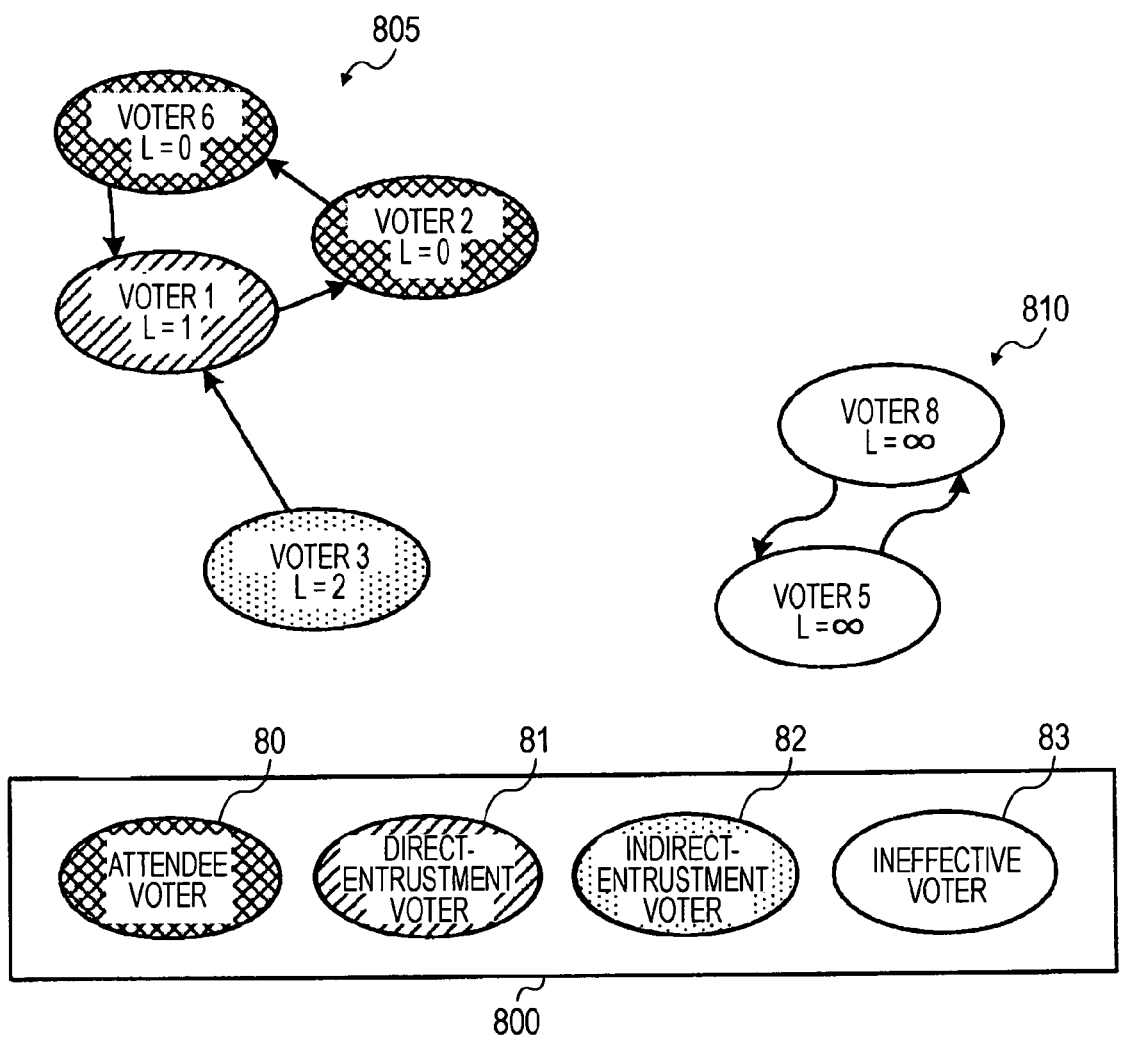
FIG. 8 illustrates classification of voters and a path length.

FIG. 3 illustrates a configuration of the general-meeting holding assistance apparatus 10 according to an example embodiment, FIG. 4 illustrates an example of the voter managing DB, FIG. 5 illustrates an example of the bill managing DB, FIG. 6 illustrates an example the attendance managing DB, FIG. 7 illustrates an example of the entrustment managing DB, and FIG. 8 illustrates classification of voters and a path length.

As illustrated in FIG. 3, the general-meeting holding assistance apparatus 10 can include a storage unit 11 and a control unit 12 and connects to the operator terminal 20 and the voter terminals 30 via the network 40.

The storage unit 11 stores data and a program required for various processes performed by the control unit 12. Particularly, as those closely related to the present invention, the storage unit 11 includes the voter managing DB 111, the bill managing DB 112, the entrustment managing DB 113, and the attendance managing DB 114.

The voter managing DB 111 stores information about voters. As illustrated in FIG. 4, the voter managing DB 111 stores voter managing information 1110 including voter IDs (identifiers) to uniquely identify respective voters, names of the voters, authentication information used for login, and e-mail addresses of the voters while associating them with each other.

The bill managing DB 112 stores information about bills 1120. As illustrated in FIG. 5, the bill managing DB 112 stores bill IDs to uniquely identify respective bills, bill titles, dates and times of general meetings, places of the general meetings, organizers of the general meetings, and content of bills while associating them with each other.

The attendance managing DB 114 stores attendance information accepted by an attendance registration accepting unit 12h from the voter terminals 30. The attendance managing DB 114 stores attendance information including 1140 information of respective voters (entrusters), attendance of the voters in a general meeting, and classification of the voters (a value of any of attendee, direct entrustment, indirect entrustment, and ineffective) while associating them with each other.

The entrustment managing DB 113 stores entrustment relationship information accepted by an entrustment registration accepting unit 12g described below from the voter terminals 30. As illustrated in FIG. 7, the entrustment managing DB 113 stores entrustment relationship information 1150 including information of entrusters who are voters performing entrustment, entrustees who are voters entrusted by the entrusters, and distribution when a plurality of entrustees are specified while associating them with each other in units of bills. Alternatively, a default entrustment relationship may be established in any bill, and the default entrustment relationship may be used when no special change occurs. Also, other relationship information (friend relationship or the like) accumulated in an SNS (social networking service) or the like may be set or recommended as an initial value of the entrustment relationship.

The shortest path length (L) to an arbitrary attendee of each voter can be calculated. As illustrated in FIG. 8, legend 800 illustrates attendee voters 80 are attendees of a general meeting (L=0), direct-entrustment voters 81 are voters who directly entrust an attendee (L=1), indirect-entrustment voters 82 are voters who indirectly entrust an attendee (1<L<∞), and ineffective voters 83 are voters who have not entrusted any attendee directly/indirectly (L=∞).

The control unit 12 includes an internal memory to store a program specifying a procedure of various processes and necessary data and executes various processes based on the program and the data. The control unit 12 includes a network communication unit 121, a login managing unit 122, a bill registering unit 123, a bill notifying unit 124, a holding information registering unit 125, a holding information notifying unit 126, the entrustment registration accepting unit 12g, the attendance registration accepting unit 12h, an entrustee information generating unit 129, a proposed-proxy transmitting unit 130, a change-requested-voter selecting unit 131, and an attitude change request transmitting unit 132. The entrustee information generating unit 129 corresponds to "indirect-entrustment voter extracting" and "entrustee determining" described in the claims, and the proposed-proxy transmitting unit 130 corresponds to "entrustee information transmitting" described in the claims.

The network communication unit 121 controls transmission/reception of various pieces of information between the operator terminal 20 and the voter terminals 30 connected via the network 40. Specifically, the network communication unit 121 receives bills and holding information from the operator terminal 20, receives entrustment registration and attendance registration from the voter terminals 30, and transmits a proposed proxy or an attitude change request to the voter terminals 30.

The login managing unit 122 manages login of voters. The bill registering unit 123 accepts bill registration from the operator terminal 20 and stores it in the bill managing DB 112. The bill notifying unit 124 notifies the voter terminals 30 of all voters of the bills stored in the bill managing DB 112. The holding information registering unit 125 accepts registration of holding information (date, time, and place) of a general meeting from the operator terminal 20 and stores it in the bill managing DB 112.

The holding information notifying unit 126 notifies the voter terminals 30 of the holding information stored in the bill managing DB 112. The entrustment registration accepting unit 12g accepts entrustment registration from the voter terminals 30 and stores it in the entrustment managing DB 113. The attendance registration accepting unit 12h accepts attendance registration to a general meeting from the voter terminals 30 and stores it in the attendance managing DB 114.

The entrustee information generating unit 129 extracts one or more indirect-entrustment voters who indirectly entrust an attendee by using the entrustment relationship information stored in the entrustment managing DB 113 and the attendance information stored in the attendance managing DB 114 and then determines attendees who are indirectly entrusted by the extracted indirect-entrustment voters to be recommended entrustees.

The entrustee information generating unit 129 extracts a list of absentees from the attendance managing DB 114 and determines whether all the absentees have been checked. Then, if not all the absentees have been checked, the entrustee information generating unit 129 can select an absentee A and calculate the shortest entrustment path length (L) to all the absentees.

Then, the entrustee information generating unit 129 determines whether there is an attendee of finite L. If there is an attendee of finite L, the entrustee information generating unit 129 determines whether the absentee A is L=1. If the absentee A is not L=1, the entrustee information generating unit 129 determines whether notification was performed in a predetermined period. If notification was performed in the predetermined period, the entrustee information generating unit 129 determines whether the notification is the final notification.

If the notification is the final notification or if the notification was not performed in the predetermined period, the entrustee information generating unit 129 determines all the attendees connected to finite L as recommended entrustees in a recommended entrustee determining process. For example, referring to FIG. 8 determination 805 illustrates when the absentee A is a voter 3, the entrustee information generating unit 129 determines voters 2 and 6, who are attendee voters, to be recommended entrustees.

Then, the entrustee information generating unit 129 adds the absentee A and the recommended entrustees associated therewith in a proposed-proxy transmission list and repeats the process to check all the absentees.

The proposed-proxy transmitting unit 130 transmits information of the recommended entrustees determined in that way to the indirect-entrustment voter. The proposed-proxy transmitting unit 130 transmits a proposed proxy indicating the recommended entrustees to the absentee who has been added to the proposed-proxy transmission list. When there are a plurality of recommended entrustees, priority order may be set.

The change-requested-voter selecting unit 131 extracts one or more ineffective voters who have not entrusted any attendee by using the entrustment relationship information stored in the entrustment managing DB 113 and the attendance information stored in the attendance managing DB 114. The change-requested-voter selecting unit 131 extracts a list of absentees and determined whether all the absentees have been checked. If not all the absentees have been checked, the change-requested-voter selecting unit 131 selects an absentee A, calculates the shortest entrustment path length (L) to all the attendees, and determines whether there is an attendee of finite L.

If there is no attendee of finite L, the change-requested-voter selecting unit 131 adds the absentee A to an ineffective voter list and repeats the process of extracting ineffective voters to check all the absentees. For example, referring to FIG. 8, determination 810 illustrates voters 5 and 8 are not connected to any attendee of finite L and are determined to be ineffective voters.

Then, if the notification is the final notification, the change-requested-voter selecting unit 131 adds all the ineffective voters to a change-requested-voter list. Also, after all the absentees have been checked, the change-requested-voter selecting unit 131 determines whether the notification is the final notification. If the notification is not the final notification, the change-requested-voter selecting unit 131 performs a requested voter determining process to select a change requested voter from among all the ineffective voters) The change-requested-voter selecting unit 131 may select an influential voter in each independent partial network.

The attitude change request transmitting unit 132 transmits a request for changing an entrustee or a prompt for attendance to the extracted ineffective voters. The attitude change request transmitting unit 132 transmits a request for attending the general meeting or entrusting an attendee to the ineffective voters added to the change-requested-voter list. Alternatively, information of attendees as recommended entrustees may be transmitted together with the request for changing an entrustee.

Figure 9:
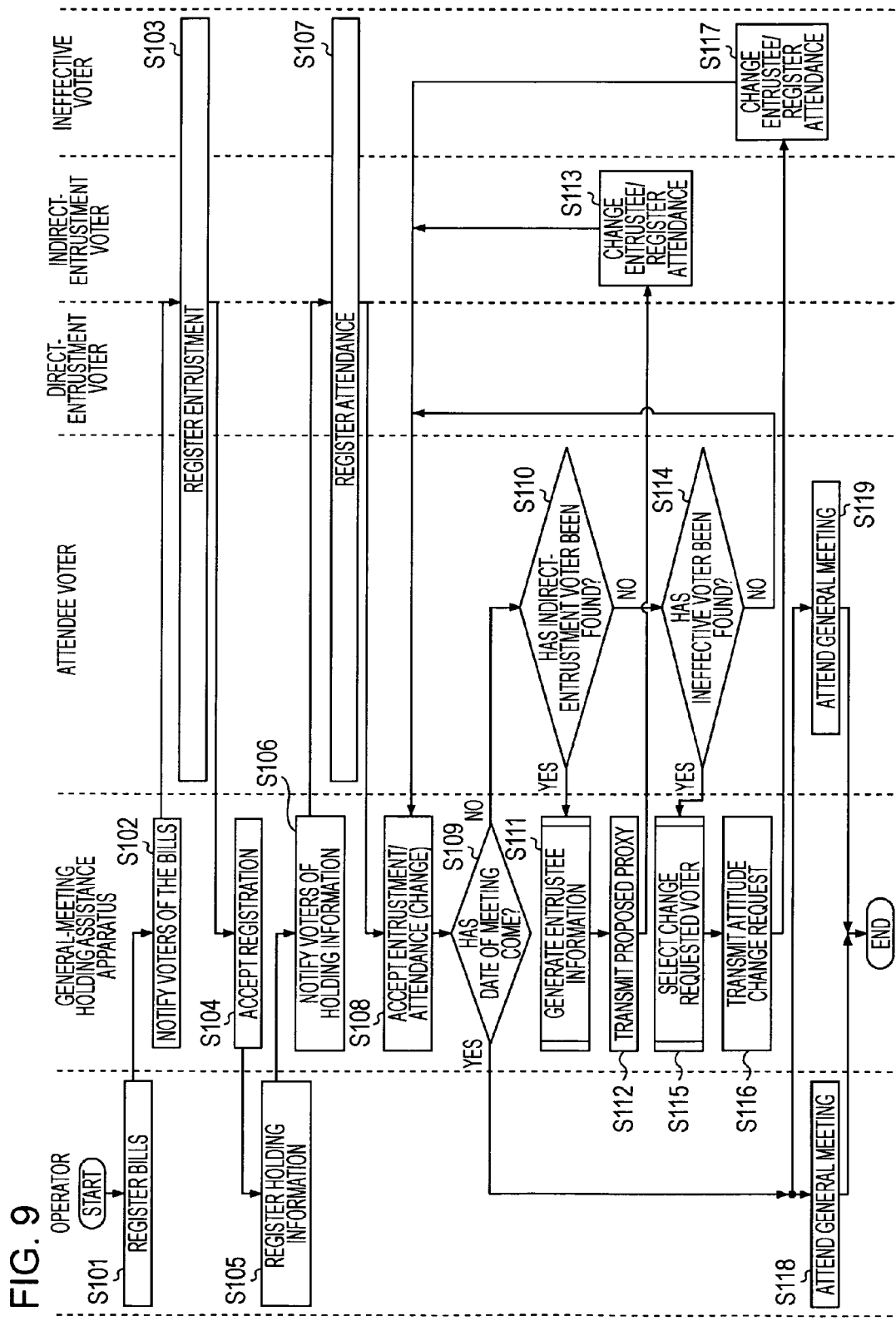
FIG. 9 illustrates a processing operation of the general-meeting holding assistance system according to an example embodiment.
Figure 10:
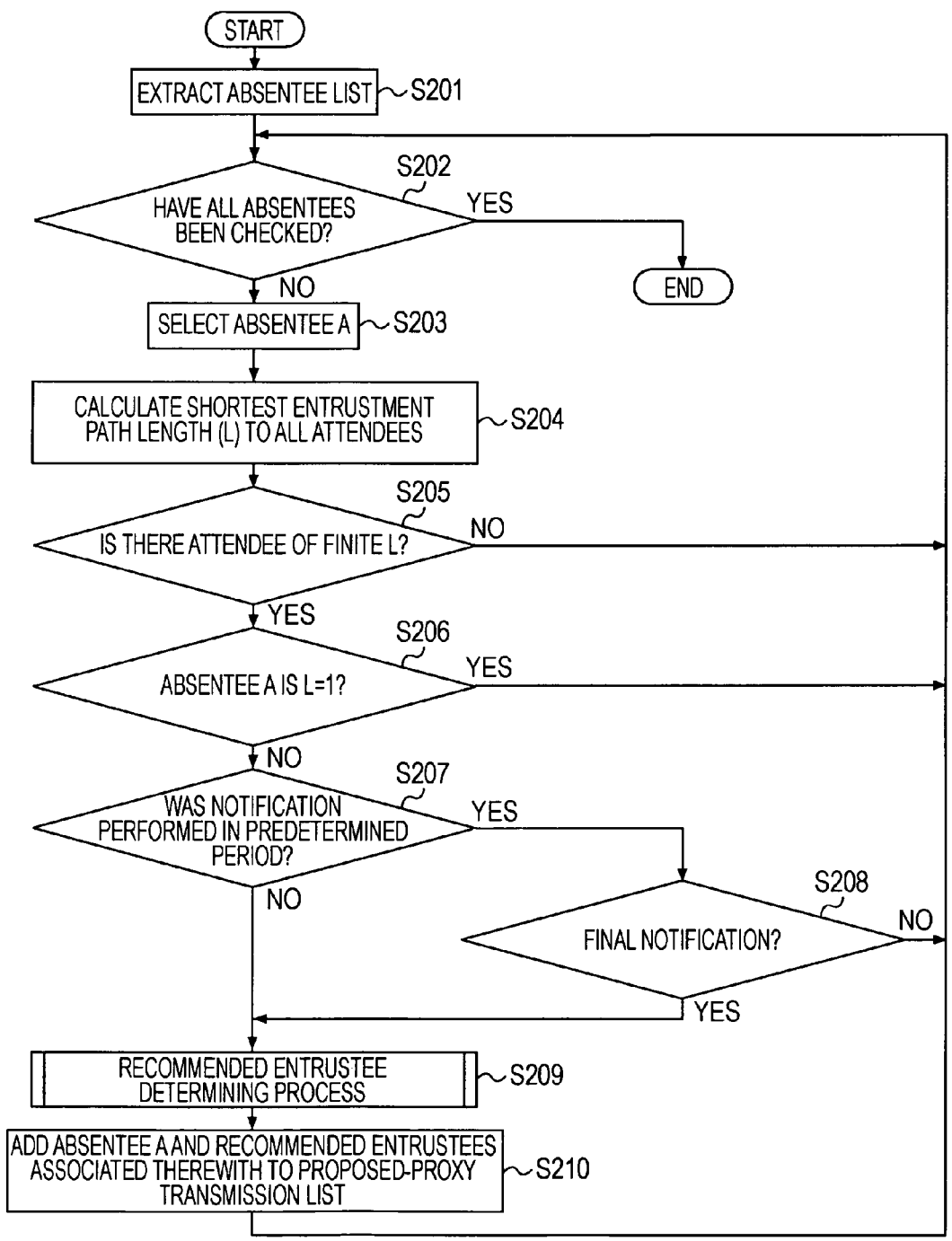
FIG. 10 illustrates an entrustment information generating process in the general-meeting holding assistance apparatus according to an example embodiment.
Figure 11:
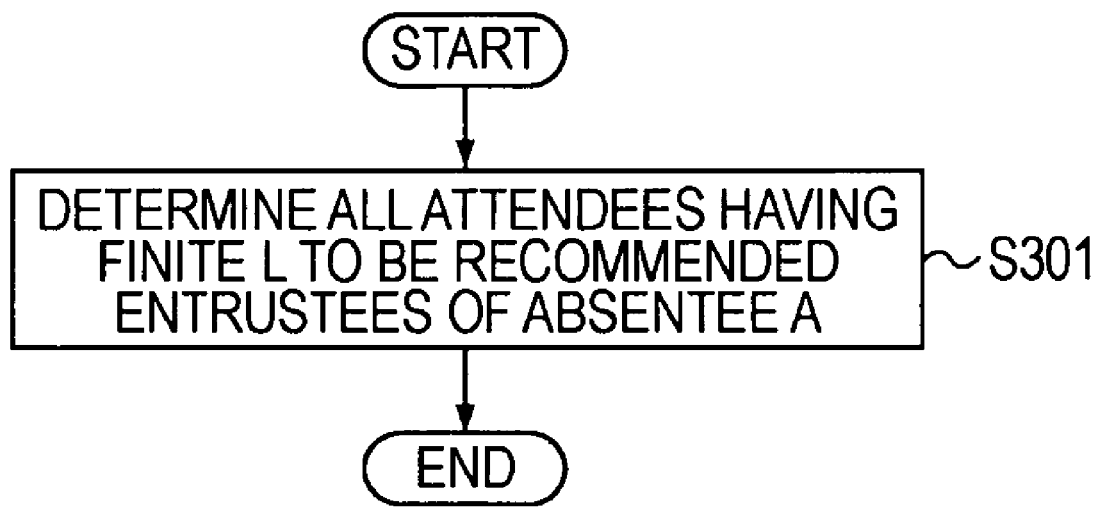
FIG. 11 illustrates a recommended entrustee determining process in the general-meeting holding assistance apparatus according to an example embodiment.
Figure 12:
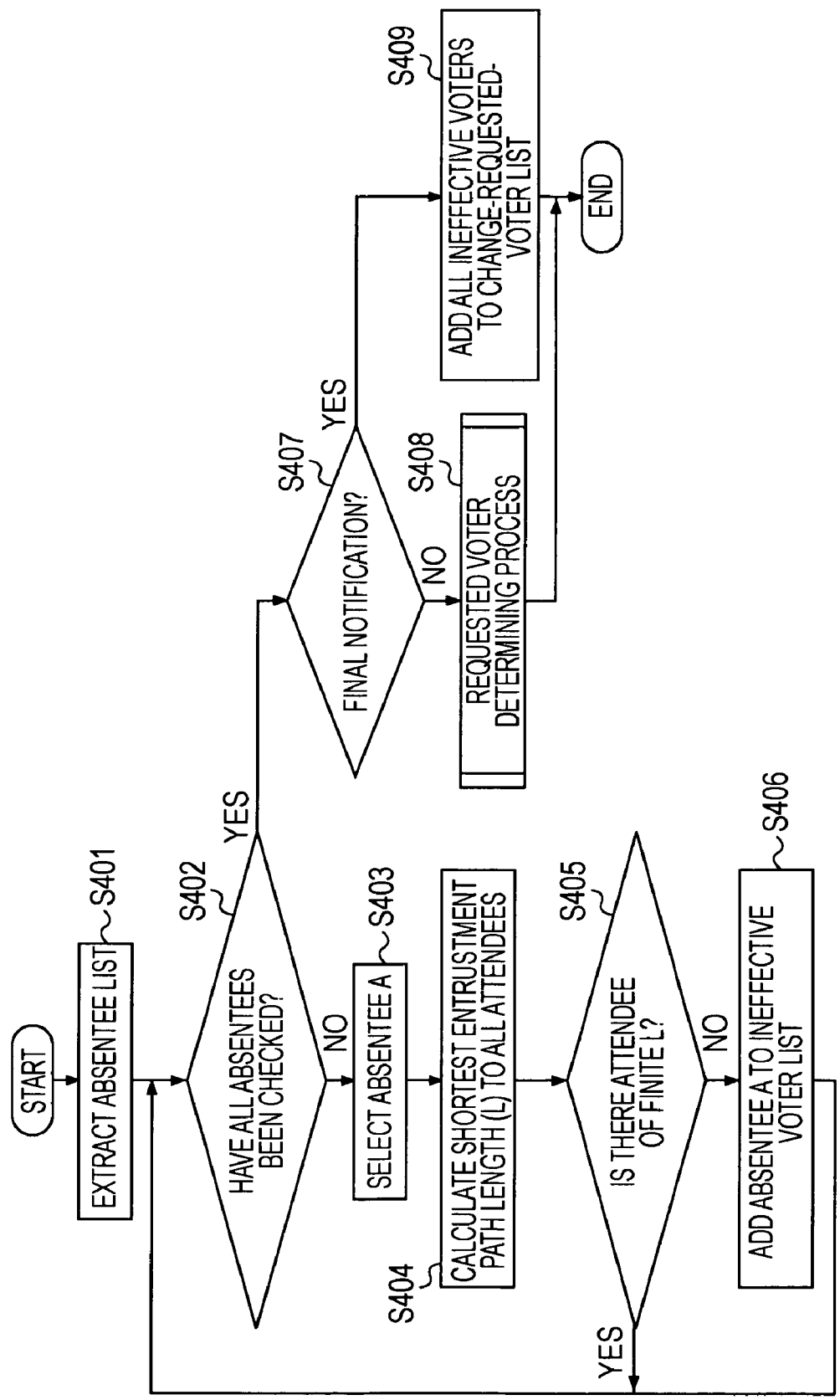
FIG. 12 illustrates a change-requested-voter selecting process in the general-meeting holding assistance apparatus according to an example embodiment.
Figure 13:
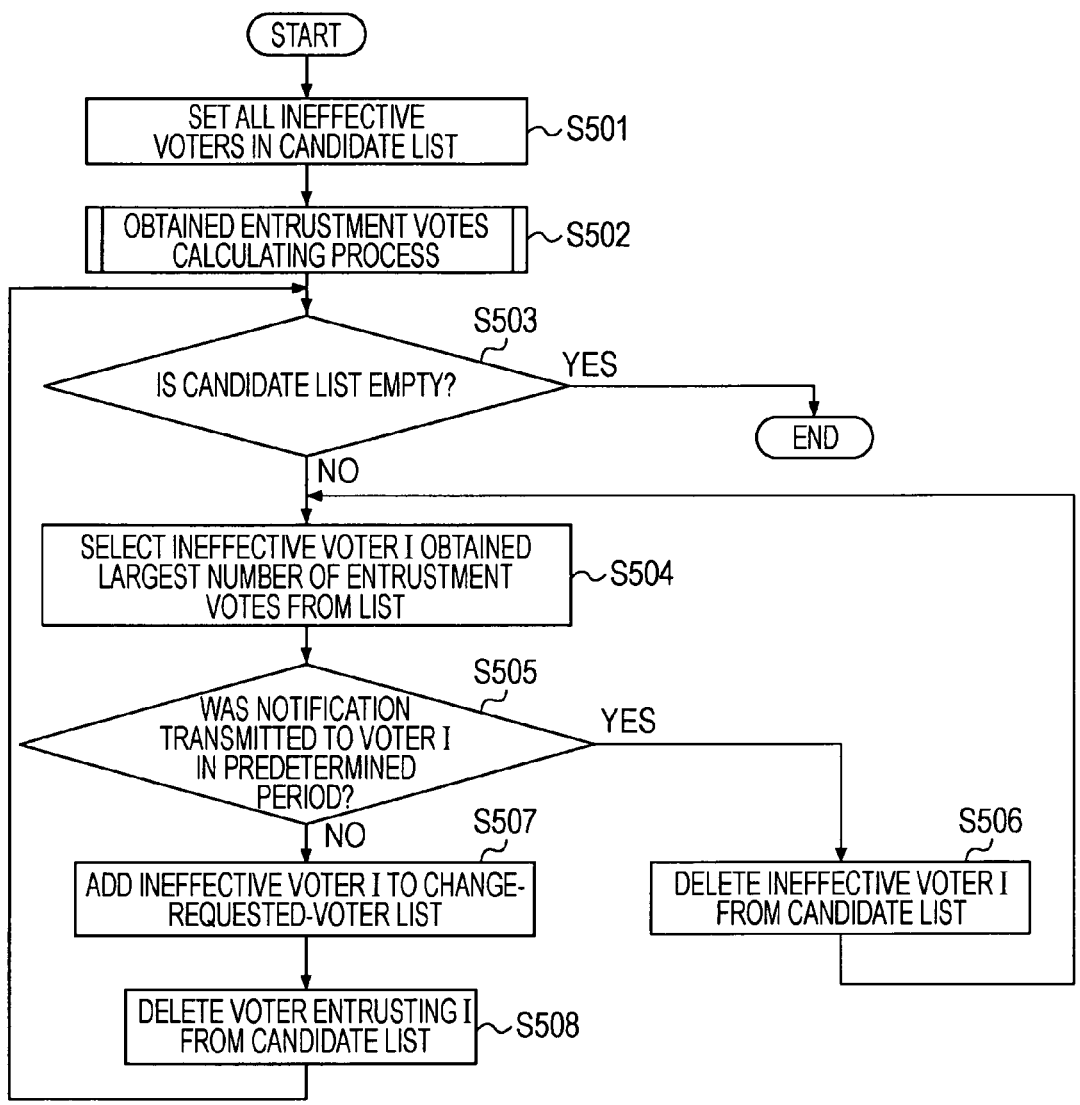
FIG. 13 illustrates a requested voter determining process in the general-meeting holding assistance apparatus according to an example embodiment.
Figure 14:
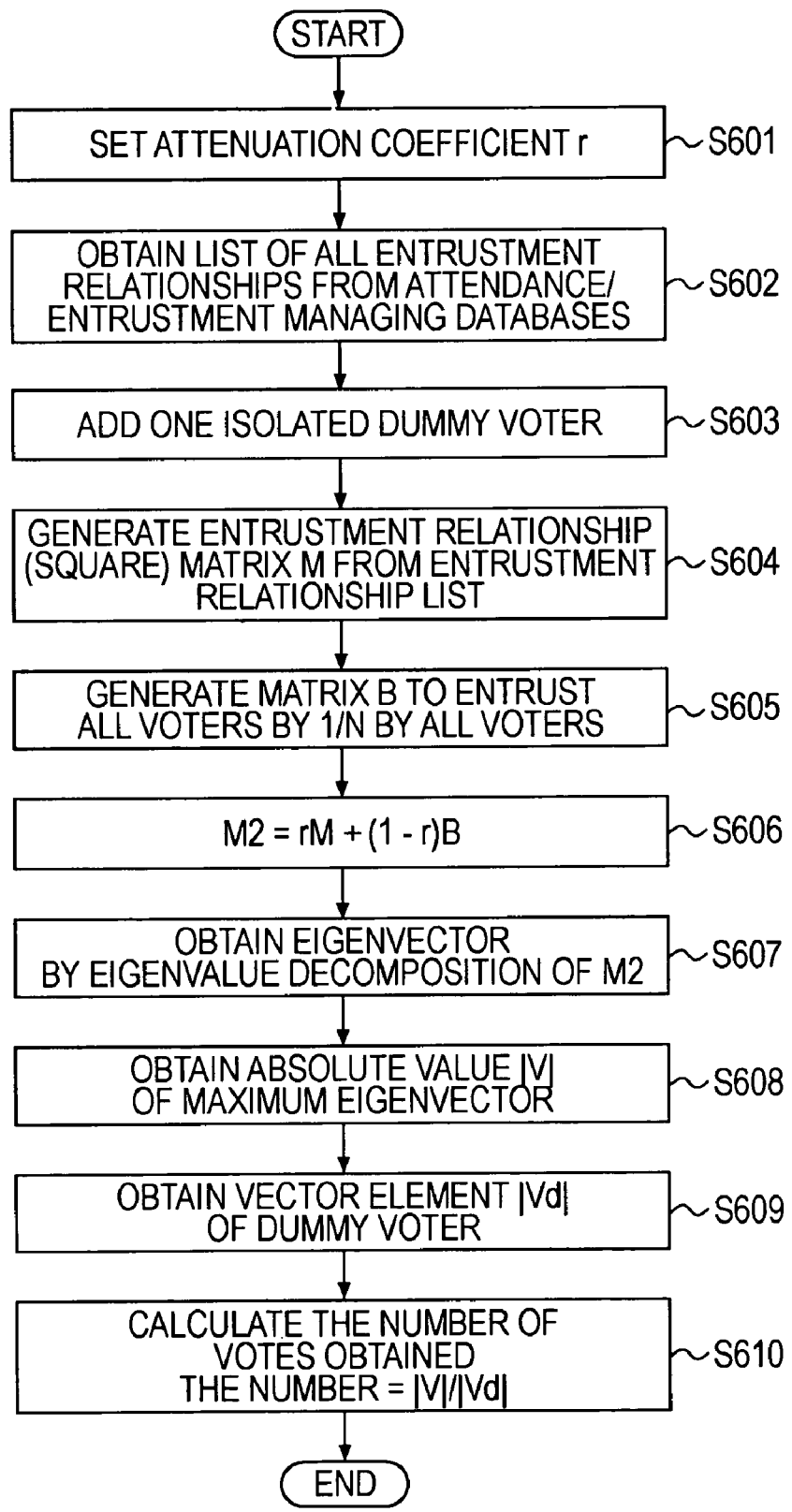
FIG. 14 illustrates an obtained entrustment votes calculating process in the general-meeting holding assistance apparatus according to an example embodiment.

FIG. 9 illustrates a processing operation of the general-meeting holding assistance system according to an example embodiment, FIG. 10 illustrates an entrustee information generating process of the general-meeting holding assistance apparatus according to an example embodiment, FIG. 11 illustrates a recommended entrustee determining process of the general-meeting holding assistance apparatus according to an example embodiment, FIG. 12 illustrates a change-requested-voter selecting process of the general-meeting holding assistance apparatus according to an example embodiment, FIG. 13 illustrates a requested voter determining process of the general-meeting holding assistance apparatus according to an example embodiment, and FIG. 14 illustrates an entrustment votes calculating process of the general-meeting holding assistance apparatus according to an example embodiment.

As illustrated in FIG. 9, the operator terminal 20 in the general-meeting holding assistance system 100 registers bills of a general meeting in the general-meeting holding assistance apparatus 10 (operation S101). Then, the general-meeting holding assistance apparatus 10 accepts the bill registration from the operator terminal 20, stores it in the bill managing DB 112, and notifies the voter terminals 30 of all voters of the bills stored in the bill managing DB 112 (operation S102).

Then, in each of the voter terminals 30, each voter logins in the system and entrusts a reliable voter in each bill (operation S103). The general-meeting holding assistance apparatus 10 accepts entrustment registration from each voter terminal 30 and stores it in the entrustment managing DB 113 (operation S104).

Then, the operator terminal 20 registers holding information (date and time, place, and so on) of the general meeting in the general-meeting holding assistance apparatus 10 (operation S105). Then, the general-meeting holding assistance apparatus 10 notifies the voter terminals 30 of the holding information stored in the bill managing DB 112 (operation S106). The voter terminals 30 that have received the notification transmit attendance information (present or absent) of the general meeting to the general-meeting holding assistance apparatus 10 (operation S107).

Then, the general-meeting holding assistance apparatus 10 accepts entrustment registration from the voter terminals 30, stores it in the entrustment managing DB 113 (operation S108), and determines whether the date of the meeting has come (operation S109). If the date of the meeting has not come (NO in operation S109) and if one or more indirect-entrustment voters have been found (YES in operation S110), the general-meeting holding assistance apparatus 10 performs the entrustee information generating process described below (operation S1) and transmits a proposed proxy to the voter terminals 30 of the indirect-entrustment voters (operation S112). Then, in the voter terminals 30 of the indirect-entrustment voters, the respective voters who have received the proposed proxy perform change of an entrustee to the general-meeting holding assistance apparatus 10 with reference to the proposed proxy (operation S113).

If the general-meeting holding assistance apparatus 10 has not found any indirect-entrustment voter (NO in operation S110) and if the general-meeting holding assistance apparatus 10 has found one or more ineffective voters (YES in operation S114), the general-meeting holding assistance apparatus 10 performs the change-requested-voter selecting process described below (operation S115) and transmits a request for changing attitude to the ineffective voters registered in the change-requested-voter list (operation S116). Then, the voter terminals 30 of the ineffective voters receive the attitude change request and perform change of an entrustee to the general-meeting holding assistance apparatus 10 or perform attendance registration to the general-meeting holding assistance apparatus 10 (operation S117).

Then, after the date of the meeting has come (YES in operation S109), the operator and the attendee voters attend the general meeting and make a decision by using proxies (operations S118 and S119).

Next, the entrustee information generating process is described with reference to FIG. 10. As illustrated in FIG. 10, the general-meeting holding assistance apparatus 10 extracts a list of absentees from the attendance managing DB 114 (operation S201) and determines whether all the absentees have been checked (operation S202). If not all the absentees have been checked (NO in operation S202), the general-meeting holding assistance apparatus 10 selects an absentee A (operation S203) and calculates the shortest entrustment path length (L) to all the attendees (operation S204).

Then, the general-meeting holding assistance apparatus 10 determines whether there is an attendee of finite L (operation S205). If there is an attendee of finite L (YES in operation S205), the general-meeting holding assistance apparatus 10 determines whether the absentee A is L=1 (operation S206). If the absentee A is not L=1 (NO in operation S206), the general-meeting holding assistance apparatus 10 determines whether notification was performed in a predetermined period (operation S207). If notification was performed in the predetermined period (YES in operation S207), the general-meeting holding assistance apparatus 10 determines whether the notification is the final notification (operation S208).

If the notification is the final notification (YES in operation S208) or if the notification was not performed in the predetermined period (NO in operation S207), the general-meeting holding assistance apparatus 10 determines all the attendees connected to finite L to be recommended entrustees in the recommended entrustee determining process (operation S209, see FIG. 11).

Then, the general-meeting holding assistance apparatus 10 adds the absentee A and the recommended entrustees associated therewith to the proposed-proxy transmission list (operation S210). Then, the process returns to operation S202 and operations S203 to S210 are repeated to check all the absentees. Also, if there is no attendee of finite L (NO in operation S205), if the absentee A is L=1 (YES in operation S206), or if the notification is not the final notification (NO in operation S208), the process returns to operation S202 and the general-meeting holding assistance apparatus 10 repeats operations S203 to S210 to check all the absentees.

Next, the change-requested-voter selecting process is described with reference to FIG. 12. As illustrated in FIG. 12, the general-meeting holding assistance apparatus 10 extracts a list of absentees (operation S401) and determines whether all the absentees have been checked (operation S402). If not all the absentees have been checked (NO in operation S402), the general-meeting holding assistance apparatus 10 selects an absentee A (operation S403), calculates the shortest entrustment path length (L) to all the attendees (operation S404), and determines whether there is an attendee of finite L (operation S405).

If there is no attendee having a finite path length (L) from the absentee A (NO in operation S405), the general-meeting holding assistance apparatus 10 adds the absentee A to the ineffective voter list (operation S406). Then, the process returns to operation S402, where the general-meeting holding assistance apparatus 10 repeats the process of extracting an ineffective voter (operations S402 to S406) to check all the absentees.

After all the absentees have been checked (YES in operation S402), the general-meeting holding assistance apparatus 10 determines whether the notification is the final notification (operation S407). If the notification is not the final notification (NO in operation S407), the general-meeting holding assistance apparatus 10 performs the requested voter determining process (specifically described below with reference to FIG. 13) to select a change requested voter from among the ineffective voters (operation S408). If the notification is the final notification (YES in operation S407), the general-meeting holding assistance apparatus 10 adds all the ineffective voters to the change-requested-voter list (operation S409).

Next, the requested voter determining process is described with reference to FIG. 13. As illustrated in FIG. 13, the general-meeting holding assistance apparatus 10 sets all the ineffective voters in a candidate list (operation S501), performs the obtained entrustment votes calculating process specifically described below with reference to FIG. 14 (operation S502), and determines whether the candidate list is empty (operation S503). If the candidate list is not empty (NO in operation S503), the general-meeting holding assistance apparatus 10 selects an ineffective voter I obtained the largest number of entrustment votes from the list (operation S504).

Then, the general-meeting holding assistance apparatus 10 determines whether notification was performed on the candidate I in a predetermined period (operation S505). If notification was performed on the candidate I in the predetermined period (YES in operation S505), the general-meeting holding assistance apparatus 10 deletes the ineffective voter I from the candidate list (operation S506), and the process returns to operation S504.

Then, the general-meeting holding assistance apparatus 10 adds the ineffective voter I to the change-requested-voter list (operation S507) and deletes the voter who entrusts the ineffective voter I from the candidate list, and then the process returns to operation S503. If the candidate list is empty (YES in operation S503), the general-meeting holding assistance apparatus 10 ends the process.

Next, the obtained entrustment votes calculating process is described with reference to FIG. 14. As illustrated in FIG. 14, the general-meeting holding assistance apparatus 10 sets an attenuation coefficient r (operation S601), obtains a list of all entrustment relationships from the attendance managing DB 113 and the entrustment managing DB 114 (operation S602), and adds an isolated dummy voter (operation S603).

Then, the general-meeting holding assistance apparatus 10 generates an entrustment relationship matrix M (square matrix of N×N) from the entrustment relationship list (operation S604), generates a matrix B to entrust all voters by 1/N by all voters (operation S605), calculates "M2=rM+(1−r)B" (operation S606), and obtains an eigenvector by eigenvalue decomposition of M2 (operation S607).

Then, the general-meeting holding assistance apparatus 10 obtains the absolute value |V| of the maximum eigenvector (operation S608), obtains a vector element |Vd| of the dummy voter (operation S609), and calculates the number of votes obtained (the number=|V|/|Vd|) (operation S610).

As described above, in the general-meeting holding assistance apparatus 10, entrustment relationship information indicating the correspondence between entrusters who are voters performing entrustment and entrustees who are voters entrusted by the entrusters is stored in the entrustment managing DB 113, and attendance information of the respective voters is stored in the attendance managing DB 114 in units of bills. The general-meeting holding assistance apparatus 10 extracts one or more indirect-entrustment voters who indirectly entrust an attendee by using the entrustment relationship information stored in the entrustment managing DB 113 and the attendance information stored in the attendance managing DB 114, determines the attendees indirectly entrusted by the extracted indirect-entrustment voters to be recommended entrustees, and transmits information of the recommended entrustees to the indirect-entrustment voters. Accordingly, the voters who have received the information of the recommended entrustees have increased opportunities to generate a proxy in accordance with the information. As a result, wasted votes caused by indirect entrustment decrease and a turnout increases, so that voting that reflects intentions of many voters can be realized.

Also, according to an example embodiment, the general-meeting holding assistance apparatus 10 extracts one or more ineffective voters who do not entrust any attendee by using the entrustment relationship information stored in the entrustment managing DB 113 and the attendance information stored in the attendance managing DB 114, and transmits an entrustment change request or a prompt for attendance to the extracted ineffective votes. Accordingly, when the ineffective voter who has received the request or prompt changes an entrustee to an effective voter or attends the general meeting, not only the ineffective voter but also other voters who entrust the ineffective voter become effective voters. Therefore, wasted votes can be decreased and a turnout can be increased, and also the risk of losing influence in the general meeting due to accidental circumstances of an isolated voter group can be reduced and diversity of values in a deciding process can be ensured.

Also, according to an example embodiment, recommended entrustee information is transmitted to an indirect-entrustment voter after a predetermined period has passed from the preceding transmission of recommended entrustee information, and thus the recommended entrustee information can be transmitted at appropriate intervals, not frequently.

Also, according to an example embodiment, all the attendees who are indirectly entrusted are determined to be recommended entrustees, and thus an indirect-entrustment voter can select an entrustee from among all the attendees.

Also, according to an example embodiment, an entrustment change request or a prompt for attendance is transmitted to an ineffective voter after a predetermined period has passed from the preceding transmission of an entrustment change request or a prompt for attendance, and thus the entrustment change request or prompt for attendance can be transmitted at appropriate intervals, not frequently.

Also, according to an example embodiment, an entrustment change request or a prompt for attendance is transmitted to an ineffective voter who has obtained many entrustment votes from other voters, and thus an entrustment change request or a prompt for attendance can be transmitted to only a voter relied by other voters.

Also, according to an example embodiment, an influential voter is specified in each group and an entrustment change request or a prompt for attendance is transmitted to the influential voter, and thus the risk that a specific interest group is left behind in a deciding process can be reduced.

Also, according to an example embodiment, information of attendees as recommended entrustees is transmitted together with an entrustment change request, and thus an ineffective voter can change an entrustee with reference to the information of the recommended entrustees.

An example embodiment of the present invention has been described above, but the present invention can be carried out in various forms other than the above-described first embodiment. Hereinafter, another embodiment included in the present invention is described.

In the above-described embodiment, the attendance managing DB 113 and the entrustment managing DB 114 are provided, but the present invention is not limited to this configuration. As illustrated in FIG. 15, a single database serving as an attendance/entrustment managing database may store attendance/entrustment information 1500 including entrustment relationship information and attendance information.

In the above-described embodiment, all attendees connected to finite L are determined to be recommended entrustees of an indirect entrustment voter in the recommended entrustee determining process, but the present invention is not limited to this. An attendee of the shortest path that is the shortest may be recommended or an attendee who has obtained the largest number of entrustment votes may be recommended.

Figure 16:
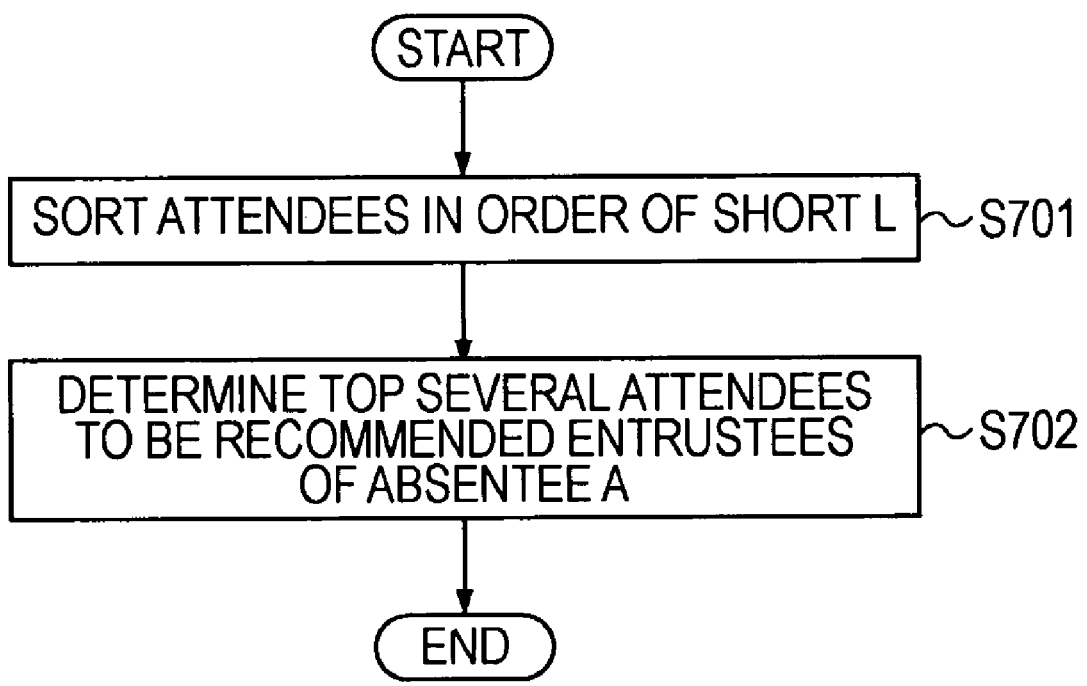
FIG. 16 illustrates a recommended entrustee determining process in the general-meeting holding assistance apparatus according to a second embodiment.

The general-meeting holding assistance apparatus 10 sorts the attendees in order of short path length L (operation S701) in a process of recommending an attendee of the shortest path that is the shortest, as illustrated in FIG. 16. Then, top several attendees are determined to be recommended entrustees of absentee A (operation S702).

Figure 17:
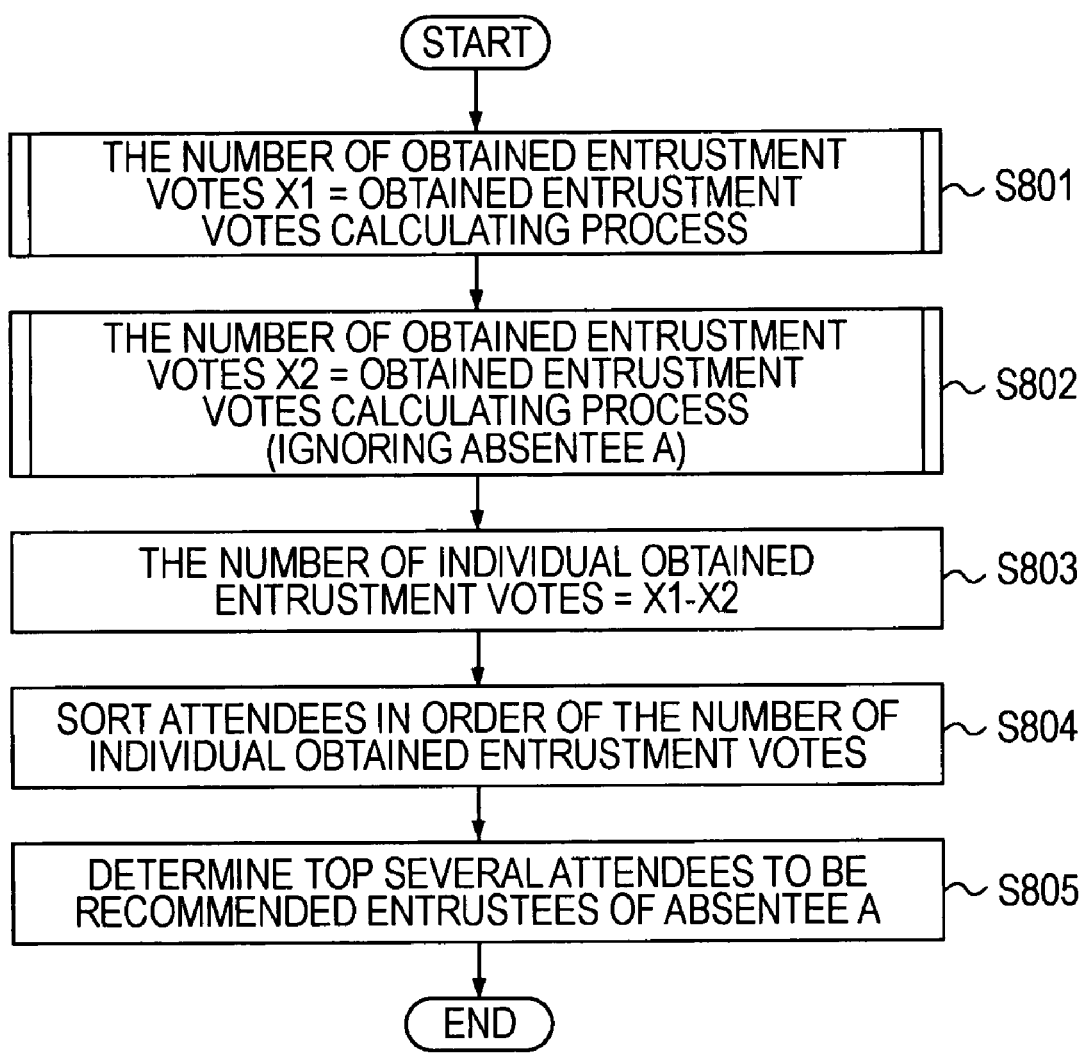
FIG. 17 illustrates the recommended entrustee determining process in the general-meeting holding assistance apparatus according to the second embodiment.

Alternatively, the general-meeting holding assistance apparatus 10 performs a process of recommending attendees obtained many individual entrustment votes, as illustrated in FIG. 17. That is, the general-meeting holding assistance apparatus 10 performs the above-described obtained entrustment votes calculating process (see FIG. 14) to calculate the number of entrustment votes X1 obtained from the voters as a whole (operation S801) and to calculate the number of entrustment votes X2 obtained from the voters except indirect-entrustment voters (operation S802). Then, the general-meeting holding assistance apparatus 10 calculates the number of individual entrustment votes by subtracting X2 from X1 (operation S803). Then, the general-meeting holding assistance apparatus 10 sorts the attendees in order of the number of individual entrustment votes (operation S804), and determines top several attendees to be recommended entrustees of the absentee A (operation S805).

In this way, the shortest path length of an entrustment relationship to respective attendees is calculated for each indirect-entrustment voter, and attendees of a short path length are determined to be the above-described recommended entrustees. Therefore, an indirect-entrustment voter can select a voter relied by a voter relied by himself/herself as a recommended entrustee.

As described above, the number of entrustment votes obtained from the voters as a whole and the number of entrustment votes obtained from the voters except indirect-entrustment voters are calculated for each attendee, the number of entrustment votes obtained from the voters except indirect-entrustment voters is subtracted from the number of entrustment votes obtained from the voters as a whole so as to calculate the number of individual entrustment votes, and attendees obtained a large number of individual entrustment votes are determined to be recommended entrustees. Accordingly, attendees who are influential for indirect entrustment can be selected as recommended entrustees.

In the above-described embodiment, an indirect-entrustment voter changes an entrustee after receiving recommended entrustee information, but the present invention is not limited to this, and the general-meeting holding assistance apparatus 10 may automatically change an entrustee. Specifically, the general-meeting holding assistance apparatus 10 accepts a change permission setting to permit change of an entrustee from a voter, and changes an entrustee to a determined recommended entrustee.

In this way, when accepting a change permission setting to permit change of an entrustee from a voter, the general-meeting holding assistance apparatus 10 changes an entrustee to a determined recommended entrustee. Accordingly, labor of an indirect-entrustment voter can be reduced.

The respective elements in each apparatus illustrated in the drawings are functional and conceptual, and need not always be physically configured as illustrated. That is, a specific form of distribution and integration in each apparatus is not limited to that illustrated in the drawings, and all or part thereof may be functionally or physically distributed or integrated in an arbitrary unit in accordance with various loads and usage situations. For example, the entrustee information generating unit 129 and the change-requested-voter selecting unit 131 may be integrated. Furthermore, all or an arbitrary part of the respective processing functions of the respective apparatuses can be realized by a CPU (central processing unit) and a program that is analyzed and executed by the CPU, or can be realized as hardware based on wired logic.

Also, among the processes described in the embodiment, all or part of the processes that are automatically performed may be manually performed. Also, all or part of the processes that are manually performed may be automatically performed in a known method. Furthermore, the processing procedure, the control procedure, the specific names, and the information including various data and parameters described in this specification or drawings may be arbitrarily changed if not otherwise specified.

Figure 18:
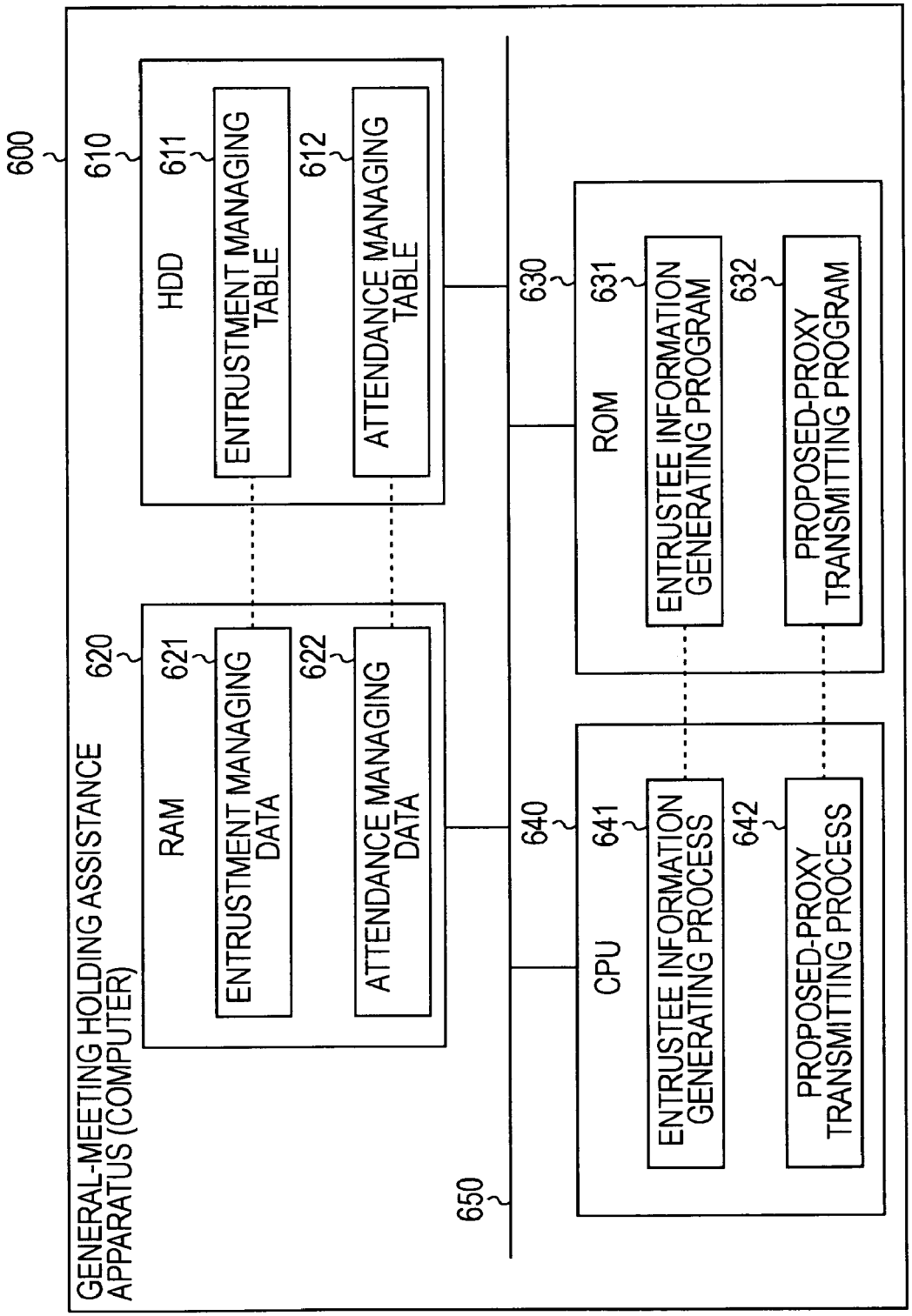
FIG. 18 illustrates an example computer executing a general-meeting holding assistance program.

The various processes described in the above embodiment can be realized by allowing a computer to execute a prepared program. FIG. 18 illustrates a computer executing an entrustee information transmitting program.

As illustrated in FIG. 18, a computer 600 serving as a general-meeting holding assistance apparatus includes an HDD (hard disk drive) 610, a RAM (random access memory) 620, a ROM (read only memory) 630, and a CPU 640, which are mutually connected via a bus 650.

The ROM 630 stores an entrustee information transmitting program having the same function as that of the above-described embodiment in advance, that is, an entrustee information generating program 631 and a proposed-proxy transmitting program 632, as illustrated in FIG. 18. The programs 631 and 632 may be integrated or distributed as necessary, like the respective elements of the general-meeting holding assistance apparatus 10 illustrated in FIG. 3.

The programs 631 and 632 function as an entrustee information generating process 641 and a proposed-proxy transmitting process 642 when the CPU 640 reads the programs 631 and 632 from the ROM 630 and executes them, as illustrated in FIG. 18. The respective processes 641 and 642 correspond to the entrustee information generating unit 129 and the proposed-proxy transmitting unit 130, respectively.

Also, as illustrated in FIG. 18, the HDD 610 is provided with an entrustment managing table 611 and an attendance managing table 612. The entrustment managing table 611 and the attendance managing table 612 correspond to the entrustment managing DB 113 and the attendance managing DB 114 illustrated in FIG. 3. The CPU 640 registers data in the entrustment managing table 611 and the attendance managing table 612, reads entrustment managing data 621 and attendance managing data 622 from the entrustment managing table 611 and the attendance managing table 612 and stores the read data in the RAM 620, and then executes processes based on the entrustment managing data 621 and the attendance managing data 622 stored in the RAM 620.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable recording medium containing an entrustee information transmitting program allowing a computer to execute an entrustee information transmitting method for transmitting information of entrustees to one or more indirect-entrustment voters who indirectly entrust an attendee of a decision that is made through voting by a plurality of voters, comprising:

an entrustment managing storage procedure of storing entrustment relationship information indicating correspondence between entrusters who are voters performing entrustment and entrustees who are voters entrusted by the entrusters in an entrustment managing storage unit;

an attendance managing storage procedure of storing attendance information of respective voters in an attendance managing storage unit in units of bills;

an indirect-entrustment voter extracting procedure of extracting one or more indirect-entrustment voter who indirectly entrust an attendee by using the entrustment relationship information stored in the entrustment managing storage unit and the attendance information stored in the attendance managing storage unit;

an entrustee determining procedure of determining attendees who are indirectly entrusted by the indirect-entrustment voters extracted in the indirect-entrustment voter extracting procedure to be recommended entrustees; and an entrustee information transmitting procedure of transmitting information of the recommended entrustees determined in the entrustee determining procedure to the indirect-entrustment voters.

2. The non-transitory computer-readable recording medium containing the entrustee information transmitting program according to claim 1, further comprising:

an ineffective voter extracting procedure of extracting one or more ineffective voters who do not entrust any attendee by using the entrustment relationship information stored in the entrustment managing storage unit and the attendance information stored in the attendance managing storage unit; and an attitude change request transmitting procedure of transmitting a request for changing entrustment or a prompt for attendance to the ineffective voters extracted in the ineffective voter extracting procedure.

3. The non-transitory computer-readable recording medium containing the entrustee information transmitting program according to claim 2, wherein the attitude change request transmitting procedure transmits the request for changing entrustment or the prompt for attendance to the ineffective voter after a predetermined period has passed from the preceding transmission of the request or the prompt.

4. The non-transitory computer-readable recording medium containing the entrustee information transmitting program according to claim 2,
wherein the attitude change request transmitting procedure transmits the request for changing entrustment or the prompt for attendance to the ineffective voter who has obtained a large number of entrustment votes from other voters.

5. The non-transitory computer-readable recording medium containing the entrustee information transmitting program according to claim 2,
wherein the attitude change request transmitting procedure specifies an influential voter in each group and transmits the request for changing entrustment or the prompt for attendance to the influential voter.

6. The non-transitory computer-readable recording medium containing the entrustee information transmitting program according to claim 2,
wherein the attitude change request transmitting procedure transmits information of attendees as recommended entrustees together with the request for changing entrustment.

7. The non-transitory computer-readable recording medium containing the entrustee information transmitting program according to claim 1,
wherein the entrustee information transmitting procedure transmits the information of the recommended entrustees to the indirect-entrustment voter after a predetermined period has passed from the preceding transmission of the information of the recommended entrustees.

8. The non-transitory computer-readable recording medium containing the entrustee information transmitting program according to claim 1,
wherein the entrustee determining procedure determines all attendees who are indirectly entrusted to be the recommended entrustees.

9. The non-transitory computer-readable recording medium containing the entrustee information transmitting program according to claim 1,
wherein the entrustee determining procedure calculates the shortest path length of an entrustment relationship to the respective attendees for each of the indirect-entrustment voters and determines attendees of a short path length to be the recommended entrustees.

10. The non-transitory computer-readable recording medium containing the entrustee information transmitting program according to claim 1,
wherein the entrustee determining procedure calculates the number of entrustment votes obtained from the voters as a whole and the number of entrustment votes obtained from the voters except the indirect-entrustment voters for each attendee, subtracts the number of entrustment votes obtained from the voters except the indirect-entrustment voters from the number of entrustment votes obtained from the voters as a whole so as to calculate the number of individual entrustment votes, and determines attendees obtained a large number of individual entrustment votes to be the recommended entrustees.

11. The non-transitory computer-readable recording medium containing the entrustee information transmitting program according to claim 1, further comprising:
an entrustee change permission accepting procedure of accepting a change permission setting to permit change of an entrustee from the voter; and
an entrustee changing procedure of changing an entrustee to the recommended entrustee determined in the entrustee determining procedure after accepting the change permission setting in the entrustee change permission accepting procedure.

12. An entrustee information transmitting system to transmit information of entrustees to one or more indirect-entrustment voters who indirectly entrust an attendee of a decision that is made through voting by a plurality of voters, the system comprising:
a computer programmed with instructions, the instruction comprising units; the units further comprising:
entrustment managing storage unit to store entrustment relationship information indicating correspondence between entrusters who are voters performing entrustment and entrustees who are voters entrusted by the entrusters in an entrustment managing storage unit;
attendance managing storage unit to store attendance information of respective voters in an attendance managing storage unit in units of bills;
indirect-entrustment voter extracting unit to extract one or more indirect-entrustment voter who indirectly entrust an attendee by using the entrustment relationship information stored in the entrustment managing storage unit and the attendance information stored in the attendance managing storage unit;
entrustee determining unit to determine attendees who are indirectly entrusted by the indirect-entrustment voters extracted by the indirect-entrustment voter extracting unit to be recommended entrustees; and
entrustee information transmitting unit to transmit information of the recommended entrustees determined by the entrustee determining unit to the indirect-entrustment voters.

13. An entrustee information transmitting method for transmitting information of entrustees to one or more indirect-entrustment voters who indirectly entrust an attendee of a decision that is made through voting by a plurality of voters, the method comprising:
a computer programmed to implement said method including:
storing entrustment relationship information indicating correspondence between entrusters who are voters performing entrustment and entrustees who are voters entrusted by the entrusters in an entrustment managing storage unit;
storing attendance information of respective voters in an attendance managing storage unit in units of bills;
extracting one or more indirect-entrustment voter who indirectly entrust an attendee by using the entrustment relationship information stored in the entrustment managing storage unit and the attendance information stored in the attendance managing storage unit;
determining attendees who are indirectly entrusted by the indirect-entrustment voters extracted in the indirect-entrustment voter extracting to be recommended entrustees; and
transmitting information of the recommended entrustees determined in the entrustee determining to the indirect-entrustment voters.

* * * * *